(12) United States Patent
Kondo

(10) Patent No.: US 9,327,637 B2
(45) Date of Patent: May 3, 2016

(54) AIMING MECHANISM FOR VEHICLE LIGHTING UNIT

(71) Applicant: Stanley Electric Co., Ltd., Tokyo (JP)

(72) Inventor: Hidetaka Kondo, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 92 days.

(21) Appl. No.: 14/218,390

(22) Filed: Mar. 18, 2014

(65) Prior Publication Data

US 2014/0286692 A1   Sep. 25, 2014

(30) Foreign Application Priority Data

Mar. 19, 2013   (JP) ................. 2013-056014

(51) Int. Cl.
| | |
|---|---|
| F21V 19/02 | (2006.01) |
| F21V 21/14 | (2006.01) |
| B60Q 1/04 | (2006.01) |
| B60Q 1/068 | (2006.01) |

(Continued)

(52) U.S. Cl.
CPC ............ *B60Q 1/0483* (2013.01); *B60Q 1/0683* (2013.01); *F16C 11/0657* (2013.01); *F21S 48/1305* (2013.01); *B60Q 2200/32* (2013.01); *F16C 11/0685* (2013.01); *F16C 2226/74* (2013.01); *F16C 2326/01* (2013.01); *F16C 2362/00* (2013.01); *Y10T 403/32237* (2015.01)

(58) Field of Classification Search
CPC ............... B60Q 1/0483; B60Q 1/0683; B60Q 2200/32; F16C 11/0657; F16C 11/0685; F16C 2226/74; F16C 2326/01; F16C 2362/00; F21S 48/1305; Y10T 403/32237

USPC ................... 403/119, 122; 362/523
See application file for complete search history.

(56) References Cited

U.S. PATENT DOCUMENTS

| | | | |
|---|---|---|---|
| 4,707,771 A * | 11/1987 | Van Duyn et al. ............ 362/528 |
| 4,870,544 A | 9/1989 | Iwamoto | |
| 5,365,415 A * | 11/1994 | Schmitt ................ B60Q 1/0686 362/422 |

(Continued)

FOREIGN PATENT DOCUMENTS

| | | |
|---|---|---|
| EP | 1405761 A1 | 4/2004 |
| FR | 2871120 A1 | 12/2005 |

(Continued)

OTHER PUBLICATIONS

Search Report for European Patent App. No. 14020037.9 (Sep. 19, 2014).

*Primary Examiner* — Gregory Binda
*Assistant Examiner* — Nahid Amiri
(74) *Attorney, Agent, or Firm* — Kenealy Vaidya LLP

(57) ABSTRACT

A vehicle lighting unit can have an aiming mechanism with a pivot holder structure such that a pivot attached to a reflector that holds a bulb is supported by a pivot holder integrally formed with a housing while the pivot is rotatable and an adjustment bolt is provided, so that the rotation of the adjustment bolt can achieve adjustment of an optical axis by inclining the reflector. The pivot holder can include a reception seat extending in a direction perpendicular to a direction in which the pivot is inserted and having an arc-like curved surface for receiving a ball of the pivot, and a pair of claws extending in the direction perpendicular to the direction in which the pivot is inserted so as to be parallel with each other and configured to support the ball, the pair of claws being coupled to each other by an arc-shaped bridge.

4 Claims, 4 Drawing Sheets

(51) Int. Cl.
*F16C 11/06* (2006.01)
*F21S 8/10* (2006.01)

(56) References Cited

U.S. PATENT DOCUMENTS

| | | | |
|---|---|---|---|
| 5,596,789 A * | 1/1997 | Simioni ............................ 16/228 |
| 5,678,915 A * | 10/1997 | Shirai et al. ................... 362/460 |
| 5,743,618 A * | 4/1998 | Fujino et al. ................... 362/528 |
| 5,879,073 A * | 3/1999 | Hori ....................... B60Q 1/007 362/263 |
| 5,993,033 A * | 11/1999 | Sugimoto et al. ............. 362/515 |
| 6,017,137 A * | 1/2000 | Suehiro et al. ................ 362/289 |
| 6,234,655 B1 * | 5/2001 | Suehiro ................. B60Q 1/076 362/515 |
| 6,345,905 B1 * | 2/2002 | Kibayashi et al. ............ 362/464 |
| 6,550,947 B1 * | 4/2003 | Kibayashi ..................... 362/515 |
| 6,719,445 B2 * | 4/2004 | Nagakura ............. B60Q 1/007 362/265 |
| 6,976,773 B2 * | 12/2005 | Cavanna ....................... 362/515 |
| 7,082,919 B2 * | 8/2006 | Nonogaki et al. ........ 123/198 E |
| 7,322,768 B2 * | 1/2008 | Ochiai et al. .................. 403/135 |
| 7,520,691 B2 * | 4/2009 | Dearing et al. ............... 403/135 |
| 8,033,701 B2 * | 10/2011 | Watanabe ............. B60Q 1/076 362/287 |
| 8,485,706 B2 * | 7/2013 | Chien ........................... 362/515 |
| 2012/0224915 A1 | 9/2012 | Chien |

FOREIGN PATENT DOCUMENTS

| | | |
|---|---|---|
| JP | 9-7405 A | 1/1997 |
| JP | 10-64307 A | 3/1998 |
| WO | WO84/00332 A1 | 2/1984 |

\* cited by examiner

AIMING MECHANISM FOR VEHICLE LIGHTING UNIT

This application claims the priority benefit under 35 U.S.C. §119 of Japanese Patent Application No. 2013-056014 filed on Mar. 19, 2013, which is hereby incorporated in its entirety by reference.

TECHNICAL FIELD

The presently disclosed subject matter relates to a pivot holder structure configured to support a pivot for an aiming mechanism with which an optical axis of a vehicle lighting unit can be adjusted.

BACKGROUND ART

Headlights or the like vehicle lighting units can be disposed at right and left front end areas of a vehicle body, and they may be provided with aiming mechanisms configured to adjust their optical axes. Such an aiming mechanism can be configured such that a pivot attached to a reflector that holds a light source is supported by a pivot holder provided to a housing while the pivot is freely rotatable. The aiming mechanism can further be provided with an adjustment bolt that is configured to be rotatable. The rotation of the adjustment bolt can achieve the optical axis adjustment by inclining the reflector.

In the vehicle lighting unit, the above described aiming mechanism can often include a pivot holder integrally formed with the housing in order to reduce the number of required parts (see, for example, Japanese Patent Application Laid-Open No. Hei. 09-007405 (1997)). One example of the pivot holder integrally formed with the housing is illustrated in FIGS. 1 and 2.

FIG. 1 is a perspective view illustrating part of a conventional pivot holder, and FIG. 2 is a side sectional view illustrating how to mold the conventional pivot holder. This conventional pivot holder 111 can be a cylindrical boss shape and integrally molded with the housing 102 at its rear surface to be projected therefrom. A spherical seat 111a can be formed inside the pivot holder 111 so as to be opened forward, and an engagement portion 111b can be formed at the rim of the opening of the spherical seat 111a. Furthermore, three slits 111c can be formed in the pivot holder 111 at its circumferential surface in the front-to-rear direction so as to allow the engagement portion 111b to be elastically deformed.

With the above configuration, a not-shown ball formed at the tip of a pivot can be fit to the pivot holder 111. Specifically, when the ball is allowed to pass through the engagement portion 111b of the pivot holder 111, the engagement portion 111b is pushed backward. After passing through the engagement portion 111b, the ball is fit within the spherical seat 111a while the engagement portion 111b can be elastically returned to its original position, so that the ball can be reliably retained to be prevented from falling off. By fitting the ball of the pivot to the pivot holder 111, the pivot and the not-shown reflector supporting the pivot can be freely rotated in all directions with the pivot holder 111.

When molding the pivot holder 111 integrally with the housing 102 as illustrated in FIG. 1, a metal mold 120 must be withdrawn from the metal mold 120 in the direction of an arrow in the drawing after the completion of molding as illustrated in FIG. 2. When the mold 120 is forcedly withdrawn, the engagement portion 111b is elastically deformed with the provision of three slits 111c formed in the pivot holder 111. However, if an excessive force during withdrawn is applied to the engagement portion 111b, the engagement portion 111b may be plastically deformed, and the engagement portion 111b cannot be returned to its original shape after the mold is withdrawn and may be enlarged in diameter. In this case, the support of the pivot may stagger, resulting in failure of illumination by the vibration of the reflector when the vehicle lighting unit is lit at night.

SUMMARY

The presently disclosed subject matter was devised in view of these and other problems and features in association with the conventional art. According to an aspect of the presently disclosed subject matter, a pivot holder structure for a vehicle lighting unit can reliably hold the pivot without staggering.

According to another aspect of the presently disclosed subject matter, there is provided a pivot holder structure for a vehicle lighting unit having an aiming mechanism configured such that a pivot attached to a reflector that holds a light source is supported by a pivot holder integrally formed with a housing while the pivot is rotatable and an adjustment bolt is provided, so that the rotation of the adjustment bolt can achieve adjustment of an optical axis by inclining the reflector. The pivot holder can include a reception seat extending in a direction perpendicular to a direction in which the pivot is inserted and having an arc-like curved surface for receiving part of a ball provided to a tip end of the pivot, and a pair of claws extending in the direction perpendicular to the direction in which the pivot is inserted so as to be parallel with each other and configured to support the ball of the pivot, the pair of claws being coupled to each other by an arc-shaped bridge.

In the pivot holder structure with the above configuration, the pair of claws can be coupled to each other by the arc-shaped bridge at their ends in the direction in which the pivot is inserted.

In the pivot holder structure, the reception seat and the claws can be formed in the pivot holder to extend in the direction perpendicular to the direction in which the pivot is inserted, and the pair of claws can be coupled to each other with the arc-shaped bridge. With this configuration, the mold for molding the pivot holder can be withdrawn in the direction perpendicular to the direction in which the pivot is inserted, and the deformation of the claws when the mold is removed can be prevented by the bridge. Therefore, the mold is not necessary to be forcedly withdrawn as in the conventional art and the plastic deformation of the claws due to the forced withdrawn of the mold can be prevented. In addition, since the holding power of the claws can be enhanced by the bridge, the pivot can be reliably supported by the pivot holder without staggering, thereby preventing the vibration of the reflector and oscillation of illumination due to the vibration of the reflector.

When the pivot is inserted into the pivot holder and the ball of the pivot at its tip end passes through the pair of claws of the pivot holder, the pair of claws can be pushed to be spread. At that time, since the pair of claws can be coupled to each other by the arc-shaped bridge, the tolerance when the claws are separated can be ensured by the deformation of the arc-shaped bridge and the stress applied to the bridge can be relieved to prevent the rapture of the bridge.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to pivot holding structures of the presently disclosed subject matter with reference to the accompanying drawings in accordance with exemplary embodiments.

Figure 1:
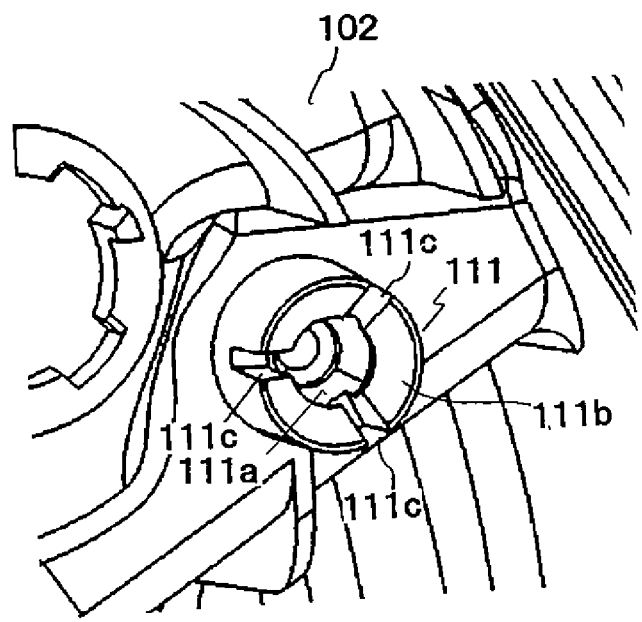
FIG. 1 is a perspective view illustrating part of a conventional pivot holder.
Figure 2:
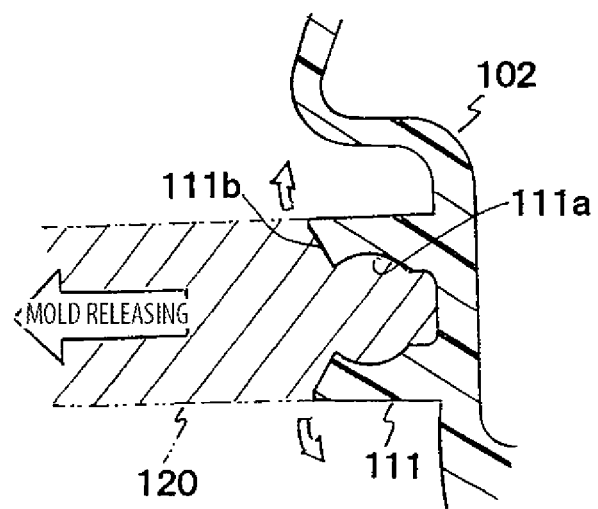
FIG. 2 is a side sectional view illustrating how to mold the conventional pivot holder.
Figure 3:
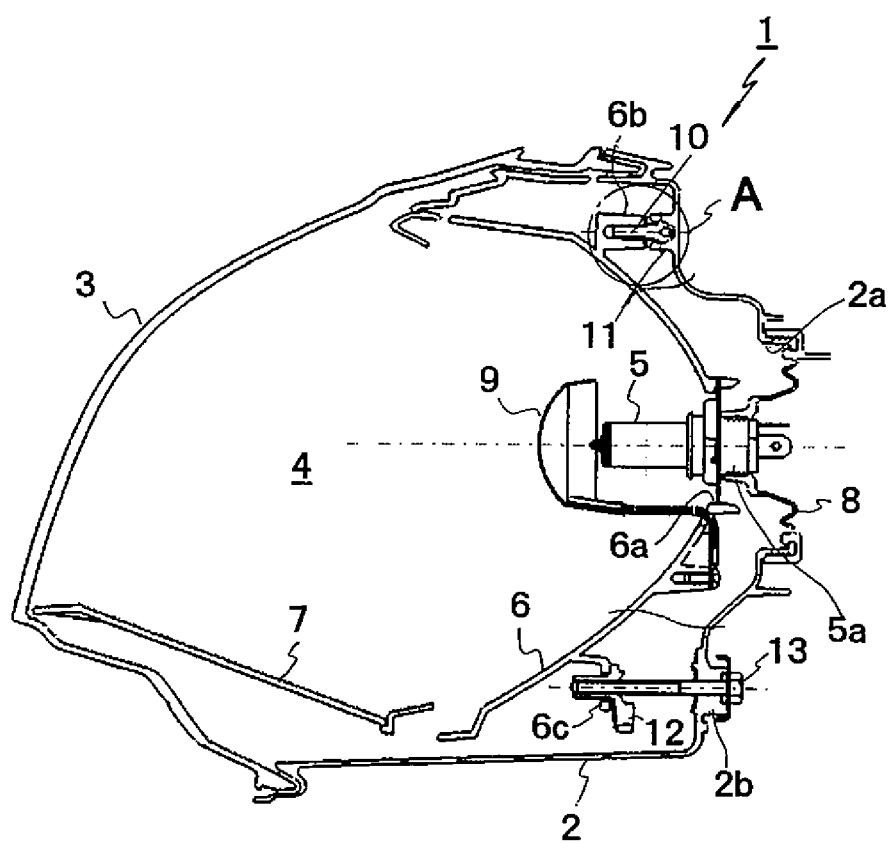
FIG. 3 is a side sectional view illustrating a vehicle lighting unit provided with a pivot holder structure made in accordance with principles of the presently disclosed subject matter.

FIG. 3 is a side sectional view illustrating a vehicle lighting unit provided with a pivot holder structure made in accordance with the principles of the presently disclosed subject matter. The vehicle lighting unit 1 as illustrated can be a headlight to be disposed at front and right front end areas of a vehicle body. The vehicle lighting unit 1 can include a housing 2 and an outer lens 3 covering an open front face of the housing 2 to define a lighting chamber 4. The vehicle lighting unit 1 can further include a bulb 5 serving as a light source, a reflector 6 configured to reflect light from the bulb 5, an extension 7 configured cover the periphery of the reflector 6, etc., which are housed in the lighting chamber 4. The right and left headlights can have the same basic configuration, and accordingly, one of them will be described herein below.

The housing 2 can be integrally formed by an opaque resin with a circular hole 2a formed at its center. The bulb 5 can pass through the circular hole 2a. A bellows cover 8 can cover the gap formed between the circular hole 2a and a socket 5a for the bulb 5.

A circular hole 6a can be formed in the reflector 6 at its center to hold the bulb 5. The reflector 6 can be provided with a shade 9 configured to shield part of light emitted from the bulb 5.

An aiming mechanism configured to adjust the optical axis of the bulb 5 in the vertical direction and horizontal direction can be provided to the headlight 1 according to the present exemplary embodiment. The aiming mechanism can include a pivot 10 and a pivot holder 11 configured to hold the pivot 10. The upper portion of the reflector 6 can be supported by the aiming mechanism to be rotatable in all direction with respect to the housing 2. Specifically, a boss 6b can be integrally formed in the upper portion of the reflector 6 at its rear surface, and the pivot 10 can be screwed to the boss 6b horizontally and toward the rear side (right side in FIG. 3). The pivot 10 can be rotatably supported by the pivot holder 11 projected and integrally formed in the inner surface of the housing 2. The structure of the pivot holder 11 will be discussed later.

A bracket 6c can be integrally formed in the lower portion of the reflector 6 at its rear surface. A nut 12 can be held by the bracket 6c. A boss 2b can be integrally formed in the lower portion of the housing 2 at a portion facing the bracket 6c and the nut 12. An adjustment bolt 13 can be rotatably supported by the boss 2b by allowing the bolt 13 to be inserted therethrough. The adjustment bolt 13 can have a screw portion extending horizontally forward in the lighting chamber 4 and be screwed to the nut 12 so as to adjust the optical axis in the vertical direction. The housing 2 can also include a not-shown adjustment bolt configured to adjust the optical axis in the horizontal direction (left-to-right direction).

When the adjustment bolt 13 is rotated for adjusting the optical axis, the nut 12 screwed to the screw portion of the adjustment bolt 13 can be moved forward and rearward along the adjustment bolt 13, so that the reflector 6 and the bulb 5 held by the reflector 6 can be rotated vertically around the supporting point of the pivot 10, thereby adjusting the optical axis of the bulb 5 vertically. In the same manner, the horizontal adjustment of the optical axis of the bulb 5 can be achieved by rotating the not-shown adjustment bolt.

A description will now be given of a structure of the pivot holder 11 according to the presently disclosed subject matter with reference to FIGS. 4 to 6.

Figure 4:
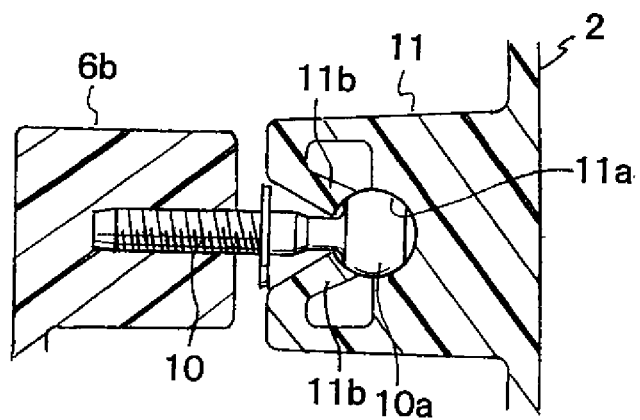
FIG. 4 is an enlarged detailed view illustrating a part A in FIG. 3.
Figure 5:
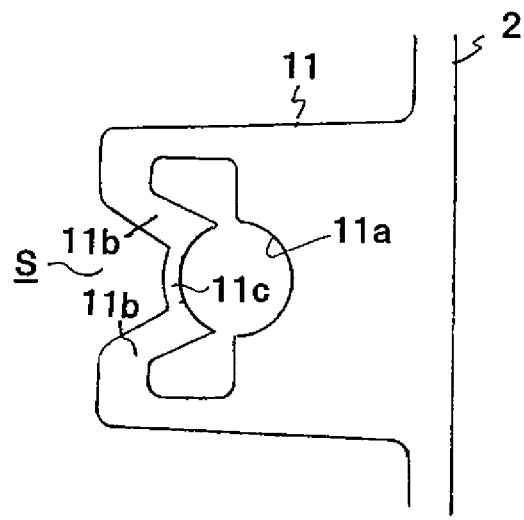
FIG. 5 is a side view of the pivot holder.
Figure 6:
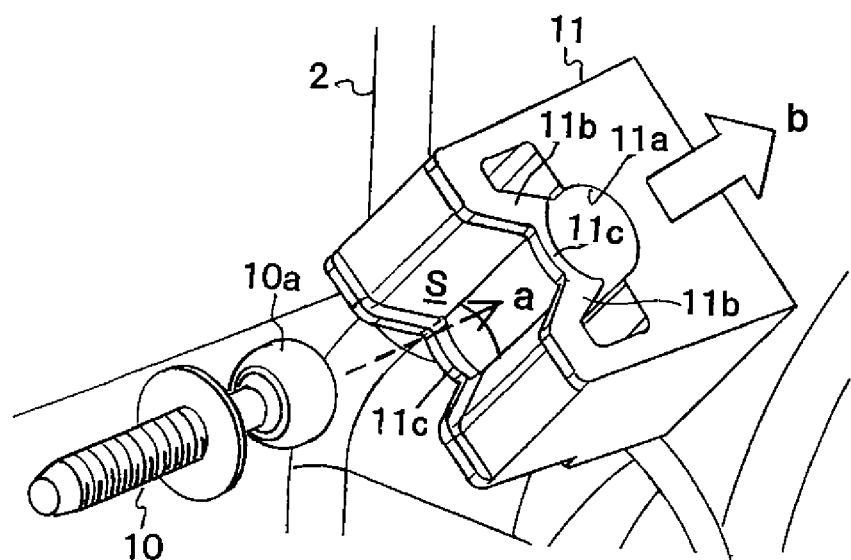
FIG. 6 is an exploded perspective view illustrating the support portion of the pivot of the vehicle lighting unit.

FIG. 4 is an enlarged detailed view illustrating a part A in FIG. 3, FIG. 5 is a side view of the pivot holder, and FIG. 6 is an exploded perspective view illustrating the support portion of the pivot of the vehicle lighting unit.

The pivot holder 11 can be a block-shaped member projected and integrally formed in the housing 2 at its inner surface. A reception seat 11a with an arc-shaped curved surface can be formed inside the pivot holder 11. The reception seat 11a can extend in a direction perpendicular (lateral direction) to the direction in which the pivot 10 is inserted (in a direction of a dotted line arrow in FIG. 6 (rearward)) and be configured to receive part of a ball 10a provided to the tip end of the pivot 10. A pair of claws 11b can be formed at the front end portion of the pivot holder 11. The claws 11b can extend in parallel with each other in a direction perpendicular to the direction in which the pivot 10 is inserted (horizontal direction) so as to support the ball 10a of the tip end of the pivot 10. The radius of curvature of the reception seat 10a formed in the pivot holder 11 can be made coincide with the radius of curvature of the ball 10a of the tip end of the pivot 10.

The pair of claws 11b can be elastically deformed and have a width inclined to be narrowed toward the reception seat 11a. The gap formed between their tip ends of the claws 11b can be set to be made smaller than the outer diameter of the ball 10a of the pivot 10. Between the pair of claws 11b vertically arranged at the front end portion of the pivot holder 11, a space S with a V-groove shape (inverted trapezoid shape) is formed. The space S can be communicated with the reception seat 11a and the slanted faces of the respective claws 11b facing the space S can configure a guiding face configured to guide the ball 10a of the pivot 10.

In the present exemplary embodiment, the tip ends of the pair of claws 11b formed in the pivot holder 11, which are both ends in the lengthwise direction thereof (horizontal direction), can be coupled with each other by an arc-shaped bridge 11c.

The ball 10a formed at the tip end of the pivot 10 can be inserted to the pivot holder 11 with the above structure in the direction a with a dotted line in FIG. 6 (rearward), while being guided by the slanted faces of the claws 11b of the pivot holder 11. The gap between the tip ends of the claws 11b of the pivot holder 11 can be set smaller than the outer diameter of the ball 10a of the pivot 10, and accordingly, when the ball 10a passes through the gap, the pair of claws 11b can be pushed and spread by the ball 10a. In other words, the ball 10a can be allowed to pass through the gap by the elastic deformation of the portions of the claws 11b.

After the ball 10a of the pivot 10 passes through the gap between the pair of claws 11b of the pivot holder while pushing to spread the claws 11b, the ball 10a can be fit to and received by the reception seat 11a of the pivot holder 11 as illustrated in FIG. 4 in part. Then, the respective claws 11b can be returned to their original states by the elasticity, and can retain the ball 10a of the pivot 10 fit to the reception seat 11a of the pivot holder 11 as illustrated in FIG. 4. Therefore, the ball 10a can be prevented from falling off the pivot holder 11, so that the pivot 10 can be reliably supported by the pivot holder 11 without staggering. As a result, the reflector 6 can be supported by the pivot 10 and the pivot holder supporting the pivot 10 while being rotatable with respect to the housing in all directions.

In the pivot holder structure according to the exemplary embodiment, the reception seat 11a and the claws 11b can be formed in the pivot holder 11 to extend in the direction (left-to-right direction) perpendicular to the direction in which the pivot 10 is inserted, and the pair of claws 11b can be coupled to each other with the arc-shaped bridge 11c. With this configuration, the mold for molding the pivot holder 11 can be withdrawn in the direction perpendicular to the direction in which the pivot is inserted (in the direction shown by arrow b in FIG. 6), and the deformation of the claws 11b when the mold is removed can be prevented by the bridge 11c. Therefore, the mold is not necessary to be forcedly withdrawn as in the conventional art and the plastic deformation of the claws 11b due to the forced withdrawn of the mold can be prevented. In addition, since the holding power of the claws 11b can be enhanced by the bridge 11c, the pivot 10 can be reliably supported by the pivot holder 11 without staggering, thereby preventing the vibration of the reflector 6 and oscillation of illumination due to the vibration of the reflector 6.

When the pivot 10 is inserted into the pivot holder 11 and the ball 10a of the pivot 10 at its tip end passes through the pair of claws 11b of the pivot holder 11, the pair of claws 11b can be pushed to be spread. At that time, since the pair of claws 11b can be coupled to each other by the arc-shaped bridge 11c, the tolerance when the claws 11b are separated can be ensured by the deformation of the arc-shaped bridge 11c and the stress acted on the bridge 11c can be relieved to prevent the rapture of the bridge 11c.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An aiming mechanism for a vehicle lighting unit, comprising a reflector that holds a light source, a housing, an adjustment bolt provided to connect the reflector and the housing so as to be rotatable, a pivot attached to the reflector, and a pivot holder that is integrally formed with the housing and supports the pivot while the pivot is rotatable, so that the rotation of the adjustment bolt can achieve adjustment of an optical axis by inclining the reflector with respect to the housing, wherein the pivot holder includes a reception seat extending in a first direction substantially perpendicular to a second direction in which the pivot supported by the pivot holder extends and having an arc-like curved surface for receiving part of a ball provided to a tip end of the pivot, and a pair of claws entirely extending in the first direction so as to be parallel with each other and configured to support the ball of the pivot, the pair of claws being coupled to each other by an arc-shaped bridge at their ends in a lengthwise direction of the claws.

2. The aiming mechanism according to claim 1, wherein the arc-shaped bridges each have an arc shape spreading in the second direction.

3. The aiming mechanism according to claim 1, wherein the pair of claws are configured to be elastically deformed and have a width inclined and narrowing toward the reception seat.

4. The aiming mechanism according to claim 1, herein tip ends of the claws are spaced apart from each other to define a gap, the gap being smaller than an outer diameter of the ball of the pivot, such that the claws elastically deform when the ball is inserted through the gap.

* * * * *